US012646408B2

(12) United States Patent
Kim

(10) Patent No.: US 12,646,408 B2
(45) Date of Patent: Jun. 2, 2026

(54) METHOD AND APPARATUS FOR CONTROLLING VEHICLE

(71) Applicant: 42DOT INC., Seoul (KR)

(72) Inventor: Hayoung Kim, Suwon (KR)

(73) Assignee: 42DOT INC., Seoul (KR)

( * ) Notice: Subject to any disclaimer, the term of this patent is extended or adjusted under 35 U.S.C. 154(b) by 332 days.

(21) Appl. No.: 18/190,351

(22) Filed: Mar. 27, 2023

(65) Prior Publication Data

US 2023/0316910 A1 Oct. 5, 2023

(30) Foreign Application Priority Data

Mar. 30, 2022 (KR) ........................ 10-2022-0039657

(51) Int. Cl.
*G08G 1/00* (2006.01)
*G08G 1/0967* (2006.01)

(52) U.S. Cl.
CPC . *G08G 1/096725* (2013.01); *G08G 1/096766* (2013.01)

(58) Field of Classification Search
CPC ................... G08G 1/096725; G08G 1/096766
See application file for complete search history.

(56) References Cited

U.S. PATENT DOCUMENTS 10,217,357 B1 * 2/2019 Elsheemy .............. B60K 35/26
2013/0110316 A1 * 5/2013 Ogawa ............. G08G 1/096725 701/1
2013/0300583 A1 * 11/2013 Wignot ................... G01S 13/91 340/907
2016/0027300 A1 * 1/2016 Raamot ................ G08G 1/0145 340/922
2016/0035223 A1 * 2/2016 Gutmann .............. B60W 30/09 340/907
2016/0075330 A1 * 3/2016 Oguri ......................... B60T 7/12 701/70
2016/0185348 A1 * 6/2016 Miura ................... B60W 30/08 701/41
2016/0280134 A1 * 9/2016 Miura ....................... G08G 1/04
2018/0012088 A1 * 1/2018 Matsuo .............. G08G 1/09623
2019/0012912 A1 * 1/2019 Kim ........................ B60K 35/10
2019/0369626 A1 * 12/2019 Lui ....................... G05D 1/0221
2020/0242922 A1 * 7/2020 Dulberg ................. G08G 1/166
2020/0342756 A1 * 10/2020 MacKenzie ....... B60W 50/0098
2021/0001868 A1 * 1/2021 Ahn ......................... G06F 17/11
2021/0039639 A1 * 2/2021 Song .................... G06V 20/584
2021/0094577 A1 * 4/2021 Shalev-Shwartz ........................... B60W 40/105
2021/0097852 A1 * 4/2021 Yoo ........................ G08G 1/005
(Continued)

FOREIGN PATENT DOCUMENTS

JP 2020-024715 A 2/2020
JP 2021110990 A 8/2021
(Continued)

*Primary Examiner* — Ian Jen
(74) *Attorney, Agent, or Firm* — Harvest IP Law, LLP

(57) ABSTRACT

Provided are a method and apparatus for controlling a vehicle, the method including receiving traffic signal information, determining whether or not a vehicle passes through a crosswalk, on the basis of the traffic signal information and driving information of the vehicle, in response to determining that the vehicle does not pass through the crosswalk, generating a virtual stop line, and controlling the vehicle not to cross the virtual stop line.

11 Claims, 12 Drawing Sheets

(56) References Cited

U.S. PATENT DOCUMENTS

| | | | | |
|---|---|---|---|---|
| 2021/0179106 | A1* | 6/2021 | Kim | B60W 30/162 |
| 2021/0303882 | A1* | 9/2021 | Mallela | G01C 21/005 |
| 2021/0309221 | A1* | 10/2021 | Alpert | G06V 20/597 |
| 2021/0312193 | A1* | 10/2021 | Alpert | B60W 40/08 |
| 2022/0024376 | A1* | 1/2022 | Shmueli Friedland | G08G 1/0133 |

FOREIGN PATENT DOCUMENTS

| | | | |
|---|---|---|---|
| KR | 20180060602 | A | 6/2018 |
| KR | 101905358 | B1 | 10/2018 |
| KR | 101951035 | B1 | 5/2019 |
| KR | 20210077046 | A | 6/2021 |
| KR | 102367151 | B1 | 2/2022 |

* cited by examiner

METHOD AND APPARATUS FOR CONTROLLING VEHICLE

CROSS-REFERENCE TO RELATED APPLICATION

This application is based on and claims priority under 35 U.S.C. § 119 to Korean Patent Application No. 10-2022-0039657, filed on Mar. 30, 2022, in the Korean Intellectual Property Office, the disclosure of which is incorporated by reference herein in its entirety.

BACKGROUND

1. Field

The disclosure relates to a method and apparatus for controlling a vehicle.

2. Description of the Related Art

Due to the convergence of information and communication technology and the vehicle industry, smartization of vehicles has rapidly progressed. Due to smartization, vehicles have evolved from simple mechanical systems to smart cars, in particular, autonomous driving has attracted attention as a core technology of smart cars. Autonomous driving refers to a technology that allows vehicles to autonomously reach destinations thereof without drivers manipulating steering wheels, accelerator pedals, brakes, or the like.

Various additional functions related to autonomous driving have been continuously developed, and there is a need for research on methods capable of providing safe autonomous driving experiences to passengers by controlling vehicles by recognizing and determining driving environments by using various types of data.

Meanwhile, autonomous vehicles may recognize and determine driving environments by installing various types of high-tech cameras, sensors, or the like, but research on methods of controlling autonomous vehicles by receiving driving environment information via communication is also continuously required.

The foregoing background art is technical information that the inventor has possessed for derivation of the disclosure or has acquired during the derivation process of the disclosure, and may not be necessarily known art disclosed to the general public prior to the filing of the disclosure.

SUMMARY

One or more embodiments include a method and apparatus for controlling a vehicle. The problems to be solved by the disclosure are not limited to the problems mentioned above, and other problems and advantages of the disclosure that are not mentioned may be understood by the following description and more clearly understood by embodiments. In addition, it will be appreciated that the problems and advantages to be solved by the disclosure may be implemented by means and combinations thereof defined in claims.

Additional aspects will be set forth in part in the description which follows and, in part, will be apparent from the description, or may be learned by practice of the presented embodiments of the disclosure.

According to one or more embodiments, a method of controlling a vehicle includes receiving traffic signal information, determining whether or not a vehicle passes through a crosswalk, on the basis of the traffic signal information and driving information of the vehicle, in response to determining that the vehicle does not pass through the crosswalk, generating a virtual stop line, and controlling the vehicle not to cross the virtual stop line.

According to one or more embodiments, an apparatus for controlling a vehicle includes a memory configured to store at least one program, and a processor configured to operate by executing the at least one program, wherein the processor is configured to receive traffic signal information, determine whether or not the vehicle passes a crosswalk, on the basis of the traffic signal information and driving information of the vehicle, in response to determining that the vehicle does not pass through the crosswalk, generate a virtual stop line, and control the vehicle not to cross the virtual stop line.

According to one or more embodiments, a computer-readable recording medium records thereon a program for executing, on a computer, a method of controlling a vehicle.

In addition, another method for implementing the disclosure, another apparatus, and a computer-readable recording medium recording thereon a program for executing the method may be further provided.

Other aspects, features and advantages other than those described above will become apparent from the following drawings, claims and detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
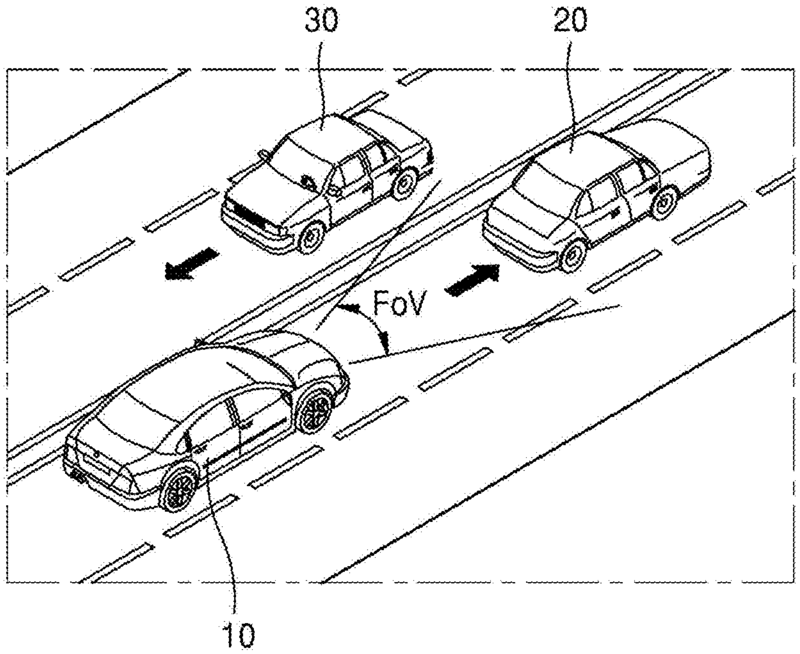
FIGS. 1 to 3 are diagrams illustrating an autonomous driving method according to an embodiment.

Advantages and features of the disclosure, and methods of achieving the same will become clear with reference to the detailed description of embodiments taken in conjunction with the accompanying drawings. However, it should be understood that the disclosure is not limited to embodiments presented below, but may be implemented in various different forms, and includes all modifications, equivalents, and alternatives included in the spirit and scope of the disclosure. The embodiments presented below are provided to complete the disclosure and to fully inform those skilled in the art to which the disclosure belongs. When describing the disclosure, the detailed description of related known arts, which may obscure the subject matter of the disclosure, will be omitted.

Terms used herein are only used to describe particular embodiments, and are not intended to limit the disclosure. As used herein, the singular forms are intended to include the plural forms as well, unless the context clearly indicates otherwise. It will be further understood that the terms "comprises," "comprising," "have," and/or "having," when used herein, specify the presence of stated features, integers, steps, operations, elements, and/or components, but do not preclude the presence or addition of one or more other features, integers, steps, operations, elements, components, and/or groups thereof.

Some of the embodiments may be represented as functional block structures and various processing operations. Some or all of these functional blocks may be implemented as a varying number of hardware and/or software components that perform particular functions. For example, functional blocks of the disclosure may be implemented by one or more microprocessors, or may be implemented by circuit components for a certain function. Also, for example, the functional blocks of the disclosure may be implemented in various programming or scripting languages. The functional blocks may be implemented as an algorithm running on one or more processors. Also, the disclosure may employ related art for electronic environment configuration, signal processing, and/or data processing, and the like. The terms such as "mechanism," "element," "means," and "component" will be used broadly, and are not limited to mechanical and physical components.

In addition, connecting lines or connecting members between components shown in the drawings are only examples of functional connections and/or physical or circuit connections. In an actual apparatus, connections between components may be represented by various functional connections, physical connections, or circuit connections that may be replaced or added.

Hereinafter, a vehicle may refer to any type of transportation means such as a car, a bus, a motorcycle, a kickboard, or a truck, that is used with an engine to move people or objects.

Hereinafter, the disclosure will be described in detail with reference to the accompanying drawings.

Referring to FIG. 1, an autonomous driving apparatus according to an embodiment may be mounted on a vehicle to implement an autonomous vehicle 10. The autonomous driving apparatus mounted on the autonomous vehicle 10 may include various types of sensors (including cameras) for collecting surrounding situation information. As an example, the autonomous driving apparatus may detect movement of a preceding vehicle 20 running in front via an image sensor and/or an event sensor mounted on the front of the autonomous vehicle 10. The autonomous driving apparatus may further include sensors for detecting the front side of the autonomous vehicle 10, another driving vehicle 30 operating in a side lane, a pedestrian around the autonomous vehicle 10, and the like.

As illustrated in FIG. 1, at least one of sensors for collecting situational information around the autonomous vehicle may have a certain field of view (FoV). For example, when a sensor mounted on the front of the autonomous vehicle 10 has a field of view (FoV) as shown in FIG. 1, information detected from the center of the sensor may have a relatively high significance. In other words, the information detected from the center of the sensor may have the relatively high significance because most of information corresponding to movement of the preceding vehicle 20 is included in the information detected from the center of the sensor.

The autonomous driving apparatus may control the movement of the autonomous vehicle 10 by processing, in real time, information collected by sensors of the autonomous vehicle 10, and may store, in a memory device, at least some of the information collected by the sensors.

Figure 2:
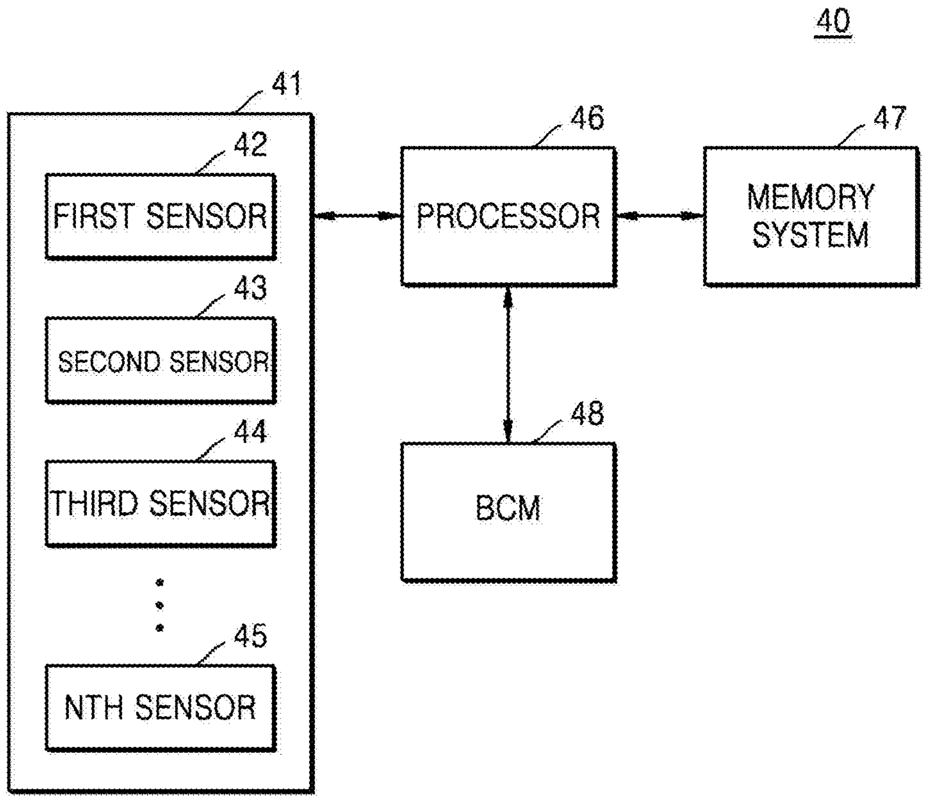

Referring to FIG. 2, an autonomous driving apparatus 40 may include a sensor unit 41, a processor 46, a memory system 47, a body control module (BCM) 48, and the like. The sensor unit 41 may include a plurality of sensors (including a camera) 42 to 45, and the plurality of sensors 42 to 45 may include an image sensor, an event sensor, an illuminance sensor, a global positioning system (GPS) device, an acceleration sensor, and the like.

Data collected by the sensors 42 to 45 may be transmitted to the processor 46. The processor 46 may store, in the memory system 47, the data collected by the sensors 42 to 45, and may determine movement of a vehicle by controlling the body control module 48 on the basis of the data collected by the sensors 42 to 45. The memory system 47 may include two or more memory devices, and a system controller for controlling the memory devices. Each of the memory devices may be provided as a single semiconductor chip.

In addition to the system controller of the memory system 47, each of the memory devices included in the memory system 47 may include a memory controller, and the memory controller may include an artificial intelligence (AI) operation circuit, such as a neural network. The memory controller may generate calculation data by assigning a certain weight to data received from the sensors 42 to 45 or the processor 46, and may store the calculation data in a memory chip.

Figure 3:
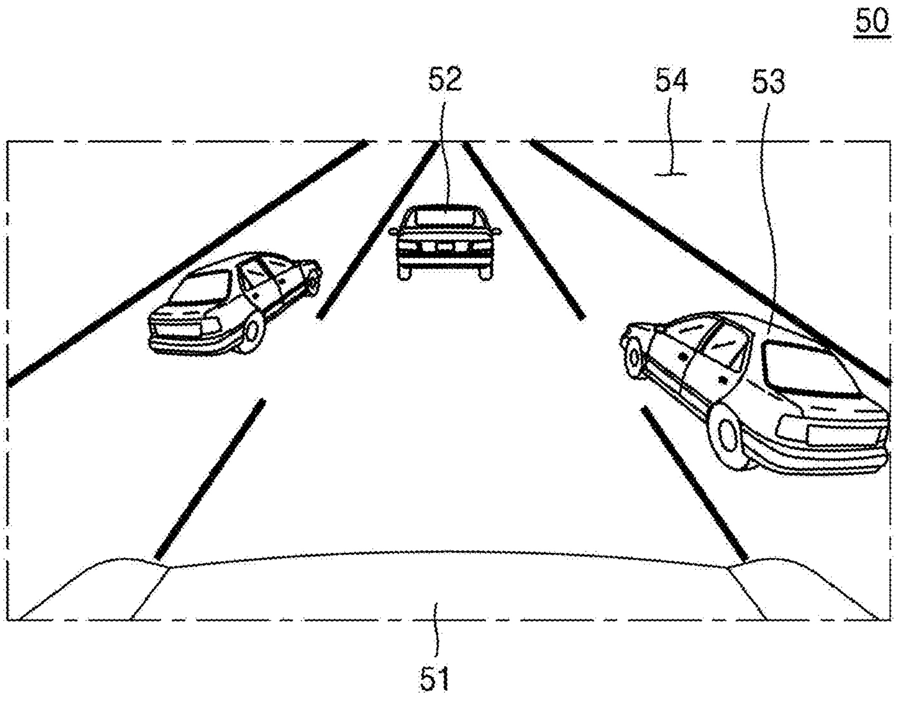

FIG. 3 is a diagram illustrating an example of image data acquired by a sensor (including a camera) of an autonomous vehicle having an autonomous driving apparatus mounted thereon. Referring to FIG. 3, image data 50 may be data acquired by a sensor mounted on the front of an autonomous vehicle. Therefore, the image data 50 may include a front portion 51 of the autonomous vehicle, a preceding vehicle 52 on the same lane as the autonomous vehicle, a driving vehicle 53 around the autonomous vehicle, a background 54, and the like.

From among the image data 50 according to the embodiment shown in FIG. 3, data of regions in which the front portion 51 of the autonomous vehicle and the background 54 appear may be data that is unlikely to affect operation of the autonomous vehicle. In other words, the front portion 51 of the autonomous vehicle and the background 54 may be regarded as data having a relatively low significance.

However, a distance to the preceding vehicle 52, movement of the driving vehicle 53 to change a lane, and the like may be highly significant factors for safe operation of the autonomous vehicle. Accordingly, from among the image data 50, data of a region including the preceding vehicle 52, the driving vehicle 53, and the like may have a relatively high significance for the operation of the autonomous vehicle.

A memory device of the autonomous driving apparatus may store the image data 50 received from the sensor by assigning different weights to respective regions of the image data 50. For example, a high weight may be assigned to the data of the region including the preceding vehicle 52, the driving vehicle 53, and the like, and a low weight may be assigned to the data of the regions in which the front portion 51 of the autonomous vehicle and the background 54 appear.

Hereinafter, operations according to various embodiments—may be understood as being performed by the autonomous driving apparatus or a processor included in the autonomous driving apparatus.

A lane on which the autonomous vehicle travels may include various markings. For example, a lane may include markings for lane markings, bumps, crosswalks, stop lines, and the like. From among various markings, a marking for a crosswalk or the like is a marking indicating that a path is provided on a road so that a pedestrian may cross the road. When a road signal in a travel direction of a vehicle is green or a pedestrian signal on a crosswalk is red, a vehicle may be present on the crosswalk, but when the pedestrian signal on the crosswalk is green and the vehicle is present on the crosswalk, a pedestrian may experience inconvenience and may be at risk. In addition, the situation described above may occur suddenly according to driving conditions (e.g., a location of a vehicle, a velocity of the vehicle, a signal change time, and the like), in particular, the situation may occur more frequently when the road is congested due to many vehicles on a road.

A method by which an autonomous vehicle passes through a crosswalk may be described below. An autonomous driving apparatus allows an autonomous vehicle to decelerate and stop when a pedestrian signal for a crosswalk is green, and controls the autonomous vehicle to travel without any particular deceleration when the pedestrian signal for the crosswalk is red. In other words, an existing method by which an autonomous vehicle passes through a crosswalk simply considers a current state of a traffic signal and does not consider a future traffic signal.

Accordingly, the disclosure provides a method of controlling an autonomous vehicle, which considers a future traffic signal, i.e., a change in a traffic signal, when the autonomous vehicle needs to pass through a crosswalk.

According to an embodiment, an autonomous driving apparatus may receive traffic signal information, and may determine whether or not a vehicle may pass through a crosswalk, on the basis of the received traffic signal information and driving information of the vehicle. When the autonomous driving apparatus determines that the vehicle may pass through the crosswalk, the autonomous driving apparatus may not take additional control. When the autonomous driving apparatus determines that the vehicle may not pass through the crosswalk, the autonomous driving apparatus may generate a virtual stop line. The autonomous driving apparatus may control an autonomous vehicle not to cross the generated virtual stop line.

Hereinafter, various embodiments related to control of a vehicle by an autonomous driving apparatus of the disclosure will be described in more detail.

In the disclosure, the autonomous driving apparatus may receive traffic signal information to control a vehicle by generating a virtual stop line.

The traffic signal information may refer to any type of information related to traffic signals that need to be strictly adhered to by a vehicle when traveling on a road and thus restricts traveling. The traffic signal information may include, for example, various types of information regarding a straight ahead signal (e.g., a green signal), a red signal, a left turn signal, and the like for a vehicle, and a green signal, a red signal, and the like for a pedestrian, and may include various types of information regarding a width of a crosswalk, whether or not a stop line is marked, a signal system of an intersection, and the like. As a detailed example, the traffic signal information may include a remaining time of a straight ahead signal, a red signal or a left turn signal for a vehicle, a remaining time of a green signal, a green flashing signal, or a red signal for a pedestrian, and the like.

In the disclosure, the autonomous driving apparatus may receive the traffic signal information on the basis of a vehicle-to-everything (V2X) technology. V2X includes vehicle-to-vehicle (V2V), vehicle-to-infrastructure (V2I), and vehicle-to-pedestrian (V2P). V2V indicates information exchange or communication between vehicles, V2I indicates information exchange or communication between a vehicle and an infrastructure, and V2P indicates information exchange or communication between a vehicle and a pedestrian. In other words, V2X refers to a technology for information exchange or communication between a vehicle and various types of information transmission nodes (e.g., another vehicle, an infrastructure, and a pedestrian). As an example, an infrastructure may include a traffic information system provided by a country, a public institution, a government office, or the like.

The V2X technology enables information transmission nodes to detect each other and provide an intelligent service to another information transmission node or an autonomous driving apparatus. The information transmission node may collect information regarding a surrounding environment by using information transmitted by another vehicle or a sensor.

In an embodiment, the autonomous driving apparatus may receive traffic signal information from various types of information transmission nodes, such as another vehicle, an infrastructure, and a pedestrian, by using the V2X technology. In other words, the traffic signal information received by the autonomous driving apparatus may be transmitted from at least one of various types of information transmission nodes.

In an embodiment, the autonomous driving apparatus may receive the traffic signal information in real time. In an embodiment, the autonomous driving apparatus may generate a signal for requesting transmission of traffic signal information and transmit the generated signal to various types of nearby information transmission nodes. Here, the generation of the signal for requesting transmission of traffic signal information and the transmission of the generated signal may be performed at every certain periods, or may be triggered and performed by a particular condition or environment. In the present embodiment, the information transmission node may transmit the traffic signal information to the autonomous driving apparatus in response to receiving the signal for requesting transmission of traffic signal information.

In an embodiment, the autonomous driving apparatus may receive all types of traffic signal information related to a traveling route, and may store the received traffic signal information in a database. In an embodiment, the autonomous driving apparatus may load the traffic signal information stored in the database, and may use the loaded traffic signal information for subsequent operations.

The autonomous driving apparatus may include a V2X communication module that performs a function of communicating with various types of information transmission nodes on the basis of the V2X technology. The autonomous driving apparatus may, via the V2X communication module, receive the traffic signal information from various types of information transmission nodes and transmit the received traffic signal information.

In the disclosure, the autonomous driving apparatus may determine whether or not a vehicle may pass through a crosswalk, on the basis of the received traffic signal information and driving information of the vehicle.

Here, the driving information of the vehicle may refer to information indicating a current driving state of the vehicle, and may include a current velocity of the vehicle, a target velocity of the vehicle, and a target acceleration of the vehicle.

The target velocity of the vehicle may refer to a velocity to which the autonomous driving apparatus changes a velocity of an autonomous vehicle from a current velocity and at which the autonomous vehicle finally travels or maintains. The target velocity may vary according to traffic volume, road regulations, a purpose of driving, a distance to a destination, remaining fuel, a traffic signal, and the like. The target velocity may be changed in real time or periodically according to a surrounding environment, a surrounding situation, a state of a vehicle, and the like by an algorithm or program installed in the autonomous driving apparatus. For example, when a road on which an autonomous vehicle travels is a highway, the target velocity may be 100 km/h. For example, when the autonomous vehicle belongs to a child protection zone, the target velocity may be 30 km/h.

The target acceleration of the vehicle may refer to an acceleration applied by the autonomous driving apparatus to change a velocity of an autonomous vehicle from a current velocity to a target velocity. The target acceleration may vary according to traffic volume, road regulations, a purpose of driving, a distance to a destination, remaining fuel, a traffic signal, and the like. The target acceleration may be changed according to a surrounding environment, a surrounding situation, and a state of the vehicle by an algorithm or program installed in the autonomous driving apparatus. Alternatively, changing the target acceleration may be infrequent more than changing the target velocity. In an embodiment, the target acceleration of the vehicle may be a value that is set as a constant value.

In an embodiment, the autonomous driving apparatus may determine whether or not a vehicle may pass through a crosswalk by predicting a future location of the vehicle. The future location of the vehicle may refer to a location of the vehicle at a particular point in future time predicted on the basis of current driving information of the vehicle.

As described above, the traffic signal information received by the autonomous driving apparatus may include signal information regarding a pedestrian, in detail, a remaining time of a red signal for a pedestrian. The remaining time of the red signal for the pedestrian has the same sense as a time remaining until a pedestrian signal changes to green, and the autonomous driving apparatus of the disclosure may predict a future location of the vehicle by considering the remaining time of the red light for the pedestrian.

In an embodiment, the autonomous driving apparatus may predict a future location of an autonomous vehicle on the basis of a current velocity of the autonomous vehicle, a target velocity of the autonomous vehicle, a target acceleration of the autonomous vehicle, and a remaining time of a red light for a pedestrian. In other words, the autonomous driving apparatus may predict the future location of the autonomous vehicle by calculating a distance that the autonomous vehicle may move or is expected to move, on the basis of the current velocity of the autonomous vehicle, the target velocity of the autonomous vehicle, the target acceleration of the autonomous vehicle, and the remaining time.

In an embodiment, in response to the current velocity of the vehicle being less than the target velocity, the autonomous driving apparatus may predict the future location of the vehicle by assuming that the vehicle travels while maintaining the target velocity until the remaining time is exhausted when the current velocity increases according to the target acceleration and reaches the target velocity.

In an embodiment, in response to the current velocity of the vehicle being greater than the target velocity, the autonomous driving apparatus may predict the future location of the vehicle by assuming that the vehicle travels while maintaining the target velocity from a current point in time to a point in time when the remaining time is exhausted.

Figure 4A:
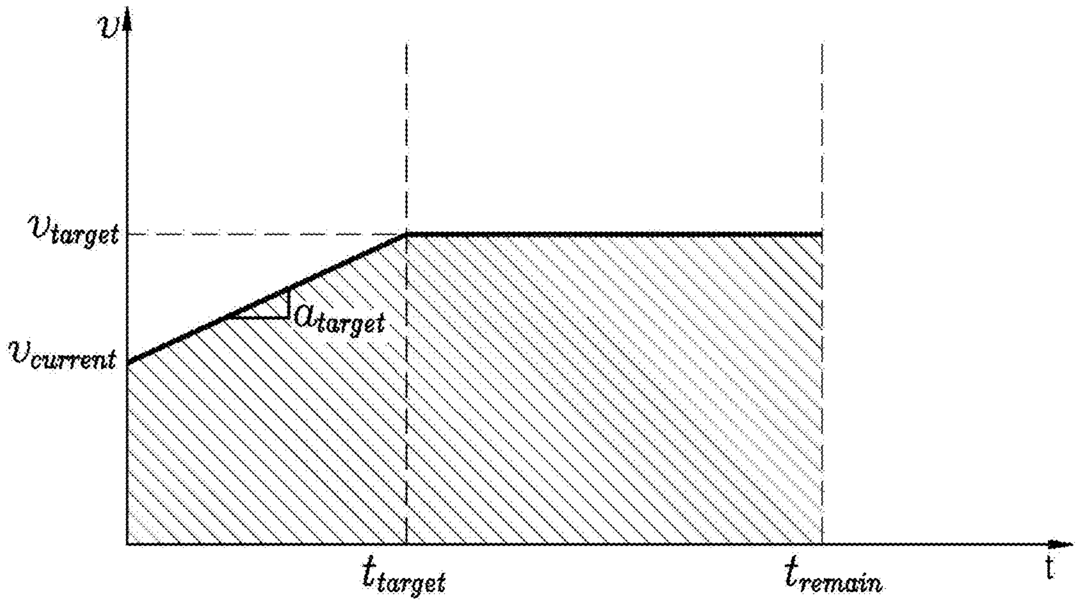
FIGS. 4A and 4B are graphs illustrating a process of predicting a future location of an autonomous vehicle, according to an embodiment.
Figure 4B:
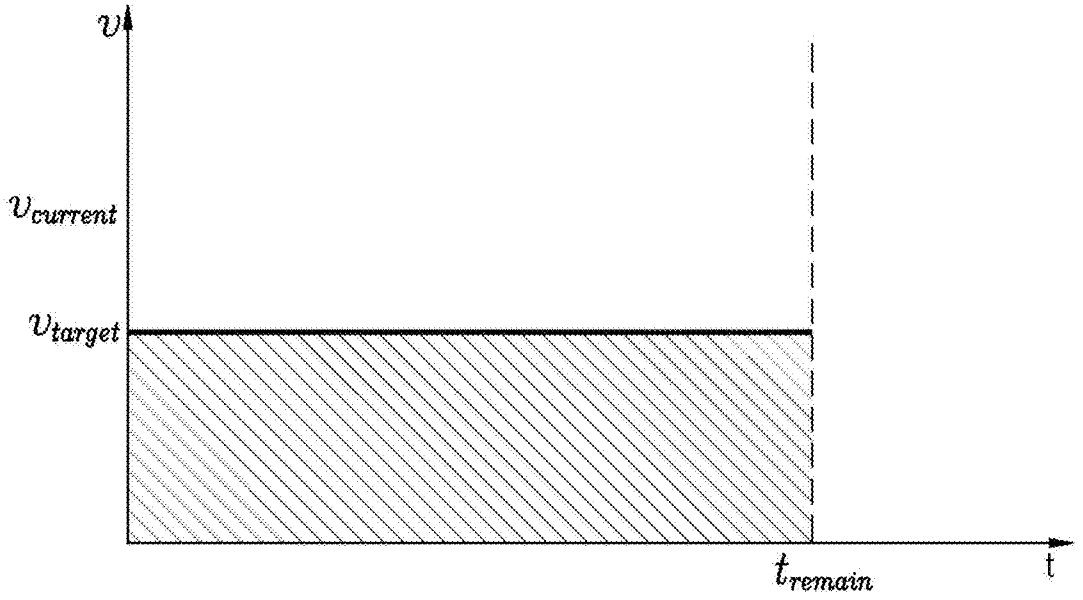

FIGS. 4A and 4B are graphs illustrating a process of predicting a future location of an autonomous vehicle, according to an embodiment.

FIG. 4A is a graph illustrating a process of predicting a future location of an autonomous vehicle when a current velocity of the autonomous vehicle is less than a target velocity, according to an embodiment.

Referring to FIG. 4A $v_{current}$ denotes a current velocity of a vehicle, $v_{target}$ denotes a target velocity of the vehicle, $a_{target}$ denotes a target acceleration of the vehicle, $t_{remain}$ denotes a remaining time of a red light for a pedestrian, and $t_{target}$ denotes a time taken to reach the target velocity of the vehicle. Referring to FIG. 4A, a current velocity of a vehicle may be less than a target velocity. For example, the current velocity of the vehicle being less than the target velocity may indicate that the target velocity of the vehicle is 60 km/h and the current velocity of the vehicle is 40 km/h, in correspondence to a velocity regulation of a road on which the vehicle travels being 60 km/h. As illustrated in FIG. 4A, the current velocity of the vehicle being less than the target velocity may be a normal situation. In the illustrated example, the target acceleration is set to a constant.

In the embodiment illustrated in FIG. 4A, when the current velocity of the vehicle increases according to the target acceleration and the velocity of the vehicle reaches the target velocity, the autonomous driving apparatus may determine that the vehicle travels while maintaining the target velocity. The autonomous driving apparatus may predict, on the basis of the above determination, a future location by calculating a distance that the vehicle is expected to travel.

As illustrated in FIG. 4A, when the graph is created by using the current velocity of the vehicle, the target velocity of the vehicle, the target acceleration of the vehicle, and the remaining time of the red signal for the pedestrian, a width of a region shown in FIG. 4A refers to a distance that the vehicle may move during the remaining time of the red light for the pedestrian.

In detail, in the illustrated example, the distance that the vehicle may move during the remaining time of the red signal for the pedestrian may be expressed as in Equation 1 below.

$$S = \frac{1}{2} \times (v_{current} + v_{target}) \times t_{target} + (t_{remain} - t_{target}) \times v_{target} \quad \text{[Equation 1]}$$

Here, $t_{target}$ is the same as $$\frac{v_{target} - v_{current}}{a_{target}}.$$

FIG. 4B is a graph illustrating a process of predicting a future location of an autonomous vehicle when a current velocity of the autonomous vehicle is greater than a target velocity, according to an embodiment.

Referring to FIG. 4B, $v_{current}$ denotes a current velocity of the autonomous vehicle, $V_{target}$ denotes is a target velocity of the autonomous vehicle, and $t_{remain}$ denotes a remaining time of a red light for a pedestrian. Referring to FIG. 4B, the current velocity of the autonomous vehicle may be greater than the target velocity. The current velocity of the autonomous vehicle being greater than the target velocity may indicate that the target velocity of the autonomous vehicle is 30 km/h and the current velocity of the autonomous vehicle is 40 km/h, in response to a change in a velocity regulation of a road on which the autonomous vehicle travels to 30 km/h.

Unlike the embodiment illustrated in FIG. 4A, in which the current velocity of the vehicle is less than the target velocity, in the embodiment illustrated in FIG. 4B, the autonomous driving apparatus may determine that the autonomous vehicle travels while maintaining the target velocity from a current point in time, rather than changing from the current velocity. The autonomous driving apparatus may predict, on the basis of the above determination, a future location by calculating a distance that the autonomous vehicle is expected to move. In other words, the autonomous driving apparatus may not consider the current velocity. The method of predicting the future location of the autonomous vehicle, as described above, may be regarded as a conservative and safety-oriented approach in an unusual situation in which a target velocity is lower than a current velocity.

As illustrated in FIG. 4B, when the graph is created by using the target velocity of the autonomous vehicle and the remaining time of the red signal for the pedestrian, a width of a region illustrated in FIG. 4B refers to a distance that the autonomous vehicle may move during the remaining time of the red signal for the pedestrian.

In detail, in the illustrated example, the distance that the autonomous vehicle may move during the remaining time of the red signal for the pedestrian may be expressed with S as in Equation 2 below.

$$s = v_{target} \times t_{remain} \quad \text{[Equation 2]}$$

In the same manner as in the embodiment described above, the autonomous driving apparatus may predict a future location of the autonomous vehicle when the remaining time of the red signal for the pedestrian elapses, by calculating the distance that the autonomous vehicle may move during the remaining time of the red signal for the pedestrian, which is included in received traffic signal information.

Meanwhile, in some embodiments, traffic signal information received by the autonomous driving apparatus may include signal information regarding a vehicle, in detail, may include a remaining time of a straight ahead signal (a green signal) for the vehicle. The remaining time of the straight ahead signal for the vehicle refers to a time remaining until a vehicle signal changes from green to red, and the autonomous driving apparatus of the disclosure may predict a future location of the vehicle by considering the same. In other words, the autonomous driving apparatus may also predict the future location of the vehicle on the basis of the remaining time of the straight ahead signal for the vehicle, rather than the remaining time of the red signal for the pedestrian. The present embodiment may be applied when a vehicle travels on a straight ahead path at an intersection or the like.

Even in the embodiment of predicting the future location of the vehicle on the basis of the remaining time of the straight ahead signal for the vehicle, those skilled in the art may easily understand that a similar method to the method in the embodiment of predicting the future location of the vehicle on the basis of the remaining time of the red signal for the pedestrian may be applied.

In an embodiment, as a result of predicting the future location of the vehicle, the autonomous driving apparatus may determine that the vehicle may pass through a crosswalk when the future location of the vehicle is a point after passing the crosswalk.

For example, when a distance from a current location of the vehicle to a point at which the crosswalk ends is 30.m, and the future location of the vehicle is 35 m from the current location of the vehicle when the remaining time of the red signal for the pedestrian elapses, the autonomous driving apparatus may determine that the vehicle may pass through the crosswalk.

In an embodiment, as the result of predicting the future location of the vehicle, the autonomous driving apparatus may determine that the vehicle may not pass through the crosswalk when the future location of the vehicle is not the point after passing through the crosswalk.

For example, when the distance from the current location of the vehicle to the point at which the crosswalk ends is 30 m, and the future location of the vehicle is 25 m from the current location of the vehicle when the remaining time of the red signal for the pedestrian elapses, the autonomous driving apparatus may determine that the vehicle may not pass through the crosswalk.

For example, when a distance from the current location of the vehicle to a point at which the crosswalk starts is 25m, the future location of the vehicle is 27m from the current location of the vehicle when the remaining time of the red signal for the pedestrian elapses, and a width of the crosswalk is 5 m, i.e., when the distance from the current location of the vehicle to the point at which the crosswalk ends is 30 m, the autonomous driving apparatus may determine that the vehicle may not pass through the crosswalk. Accordingly, the autonomous driving apparatus may determine that the vehicle may pass through the crosswalk only when the vehicle not only enters the crosswalk but also completely leaves the crosswalk.

In an embodiment, the autonomous driving apparatus may also determine, on the basis of dimensional information of the vehicle, whether or not the vehicle may pass through the crosswalk.

In an embodiment, the autonomous driving apparatus may determine a location of the vehicle on the basis of the foremost front of the vehicle. In the present embodiment, a reference distance for determining whether or not the vehicle may pass through the crosswalk may be longer by the total length of the vehicle than the distance from the current location of the vehicle to the point at which the crosswalk ends. For example, when the distance from the current location of the vehicle to the point at which the crosswalk ends is 30 m and the total length of the vehicle is 2 m, the autonomous apparatus may determine that the vehicle may pass through the crosswalk when the future location of the vehicle needs to be at least 32 m from the current location after the remaining time of the red signal for the pedestrian elapses.

In an embodiment, the autonomous driving apparatus may determine a location of the vehicle on the basis of a line connecting rear wheels of the vehicle. In the present embodiment, the reference distance for determining whether or not the vehicle may pass through the crosswalk may be longer by a distance from the line connecting the rear wheels of the vehicle to the rearmost side of the vehicle than the distance from the current location of the vehicle to the point at which the crosswalk ends. For example, when the distance from the current location of the vehicle to the point at which the crosswalk ends is 30 m and the distance from the line connecting the rear wheels of the vehicle to the rearmost side of the vehicle is 0.5 m, the autonomous driving apparatus may determine that the vehicle may pass through the crosswalk when the future location of the vehicle needs to be at least 30.5 m from the current location after the remaining time of the red signal for the pedestrian elapses.

In the foregoing embodiments, particular values for a velocity, a distance, a dimension, a location determination criterion, and the like are provided as examples, and do not limit the disclosure.

In an embodiment, when another vehicle travels at a lower velocity than the current velocity of the vehicle between the vehicle and the crosswalk, the autonomous driving apparatus may set the target velocity of the vehicle to be the same as the velocity of the other vehicle. In other words, the vehicle may not travel at a higher velocity than a velocity of a preceding vehicle, apart from an existing target velocity. In an embodiment, when a plurality of other vehicles are present between the vehicle and the crosswalk, the autonomous driving apparatus may consider only a velocity of the other vehicle located at the backmost from among the plurality of other vehicles. In the present embodiment, the future location of the vehicle may be predicted on the basis of the reset target velocity of the vehicle and the remaining time of the red light for the pedestrian.

In the disclosure, the autonomous driving apparatus may allow the vehicle to continuously travel without changing a current method of controlling the vehicle, in response to determining that the vehicle may pass through the crosswalk.

In the disclosure, the autonomous driving apparatus may generate a virtual stop line corresponding to the crosswalk, in response to determining that the vehicle may not pass through the crosswalk.

The virtual stop line may refer to a reference line through which the autonomous driving apparatus reduces a velocity of a vehicle and controls the vehicle to stop without crossing the reference line. The autonomous driving apparatus may control the vehicle to stop by generating the virtual stop line in various situations in which the vehicle needs to stop, such as a change in a signal or the occurrence of an emergency situation.

In the disclosure, the autonomous driving apparatus may generate the virtual stop line via various methods for the safety of pedestrians and passengers.

FIGS. 5A to 5E are diagrams illustrating a process of generating a virtual stop line by an autonomous driving apparatus, according to an embodiment.

Figure 5A:
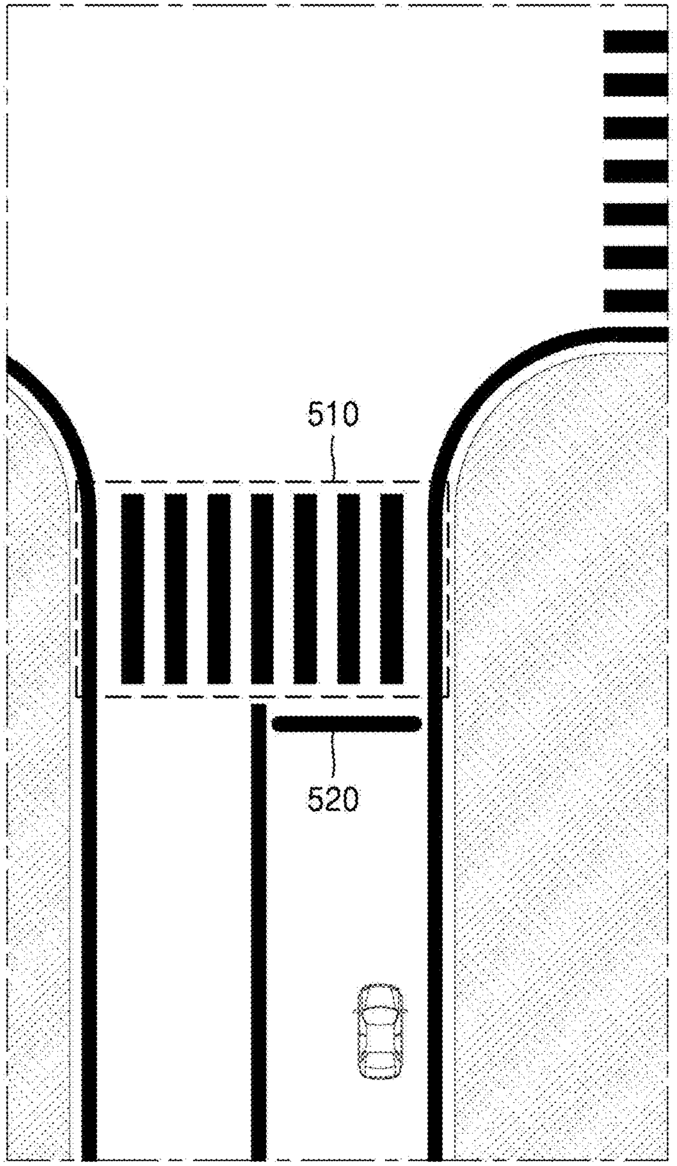
FIGS. 5A to 5E are diagrams illustrating a process of generating a virtual stop line by an autonomous driving apparatus, according to an embodiment.

FIG. 5A schematically illustrates a crossroad including a crosswalk having a stop line marked on a side thereof.

Referring to FIG. 5A, a vehicle travels along a road and passes through a crosswalk 510 after some time. Referring to FIG. 5A, a stop line 520 may be marked between the crosswalk 510 and the vehicle, i.e., before a point at which the vehicle enters the crosswalk 510.

In an embodiment, when a stop line is marked between a crosswalk and a vehicle, i.e., before a point at which the vehicle enters the crosswalk, an autonomous driving apparatus may generate a virtual stop line to be the same as the marked stop line.

Figure 5B:
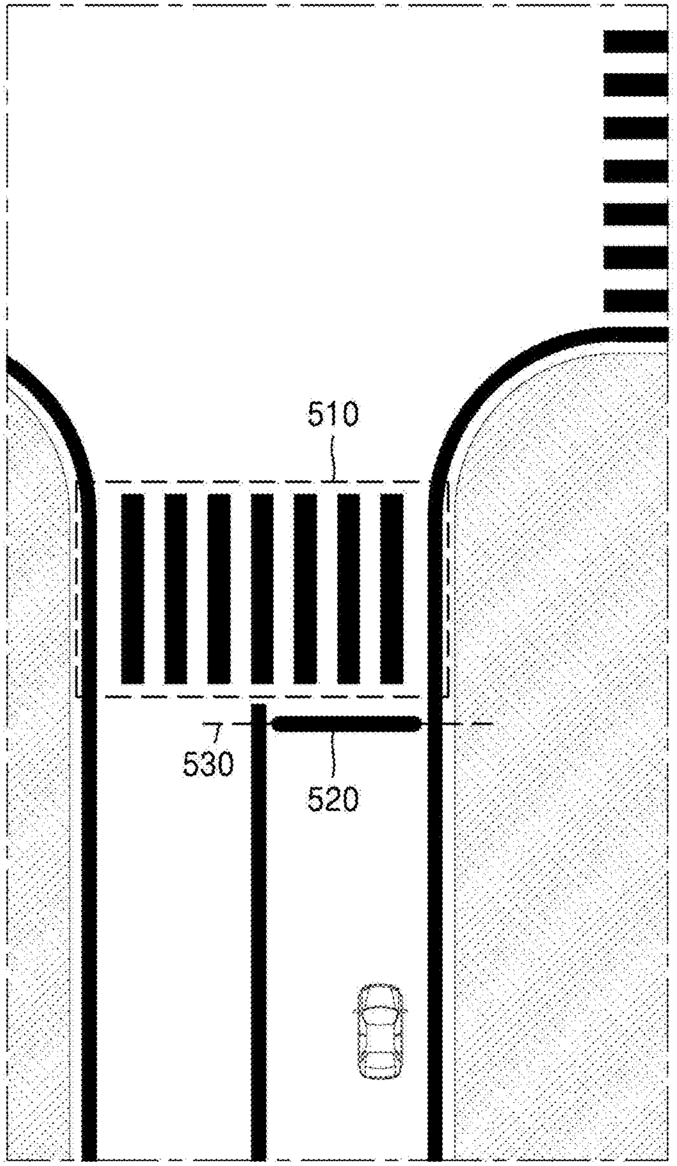

FIG. 5B schematically illustrates a virtual stop line generated for a crosswalk having a stop line marked on a side thereof, according to an embodiment.

Referring to FIG. 5B, an autonomous driving apparatus may determine that a vehicle may not pass through a crosswalk and generate a virtual stop line 530, according to the process described in the embodiment described above. In detail, the autonomous driving apparatus may detect that a stop line 520 is marked before a point at which the vehicle enters a crosswalk 510, and may generate the virtual stop line 530 to be the same as the stop line 520.

In an embodiment, the autonomous driving apparatus may generate a virtual stop line parallel to the marked stop line by separating the virtual stop line from the marked stop line by a certain distance in a direction of the vehicle.

In an embodiment, when a stop line is not marked between a crosswalk and a vehicle, i.e., before a point at which the vehicle enters the crosswalk, an autonomous driving apparatus may generate a virtual stop line parallel to the crosswalk by separating the virtual stop line from the crosswalk by a certain distance.

Figure 5C:
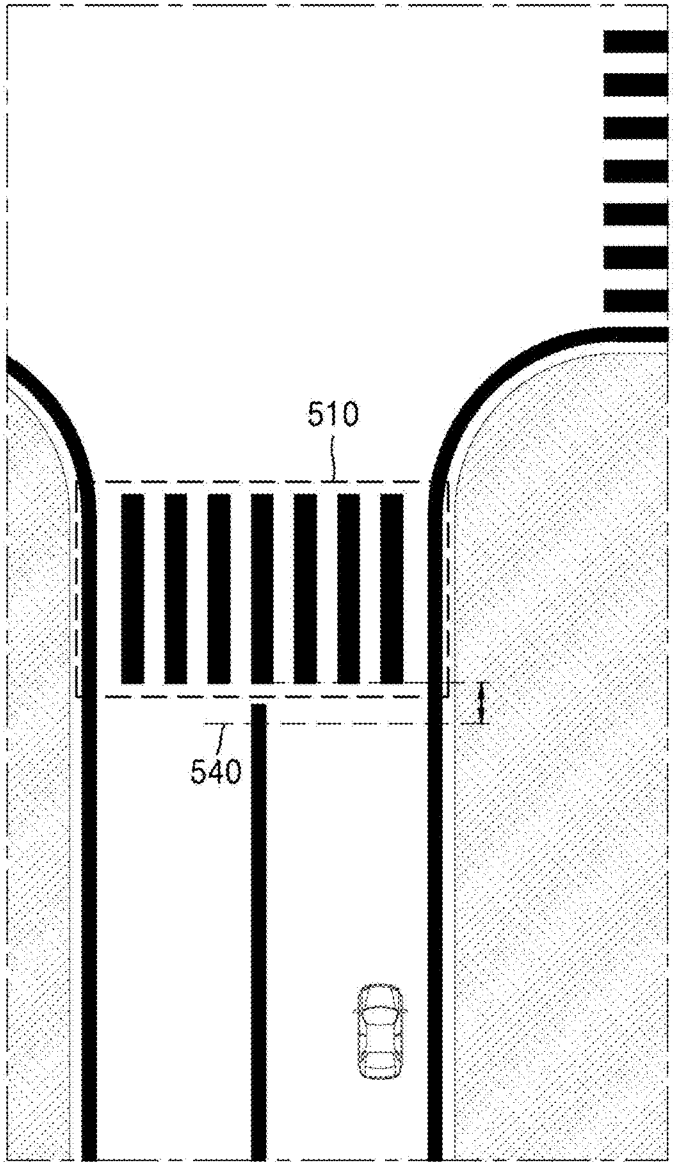

FIG. 5C schematically illustrates a virtual stop line generated for a crosswalk for which a stop line is not marked on a side, according to an embodiment.

Referring to FIG. 5C, an autonomous driving apparatus may detect that a stop line is not marked before a point at which a vehicle enters a crosswalk 510, and may generate a virtual stop line 540 parallel to the crosswalk 510 by separating the virtual stop line 540 from the crosswalk 510 by a certain distance.

In an embodiment, the certain distance may be any appropriate value, such as 0.3 m, 0.5 m, 0.7 m, 1 m, 2 m or 5m. In an embodiment, the certain distance may be calculated on the basis of a distance from a crosswalk to the foremost front of a vehicle. In an embodiment, the certain distance may be calculated on the basis of a distance from the crosswalk to a line connecting rear wheels of the vehicle. Here, the certain distance may be greater than the total length of the vehicle.

In an embodiment, the vehicle may travel along a right-turning path including two crosswalks, and thus, the vehicle may pass through two crosswalks in succession. In the disclosure, when two crosswalks are included on a right-turning path, the crosswalk through which the vehicle passes first is defined as an entry crosswalk or a first crosswalk, and the crosswalk through which the vehicle passes later is defined as an exit crosswalk or as a second crosswalk.

In an embodiment, the autonomous driving apparatus determining whether or not the vehicle may pass through the crosswalk by predicting a future location of the vehicle may include determining whether or not the vehicle may pass through the entry crosswalk and determining whether or not the vehicle may pass through the exit crosswalk. In an embodiment, the autonomous driving apparatus may determine whether or not the vehicle may pass through the exit crosswalk after determining that the vehicle may pass through the entry crosswalk. It may be easily understood by those skilled in the art that, in relation to the process of determining whether or not the vehicle may pass through the crosswalk, the above-described embodiments may be applied to the process of determining whether or the vehicle may pass through the entry crosswalk or the exit crosswalk.

In an embodiment, when determining that the vehicle may not pass through the entry crosswalk, the autonomous driving apparatus may generate a first virtual stop line corresponding to the entry crosswalk. In an embodiment, when determining that the vehicle may pass through the entry crosswalk but may not pass through the exit crosswalk, the autonomous driving apparatus may generate a second virtual stop line corresponding to the exit crosswalk.

Figure 5D:
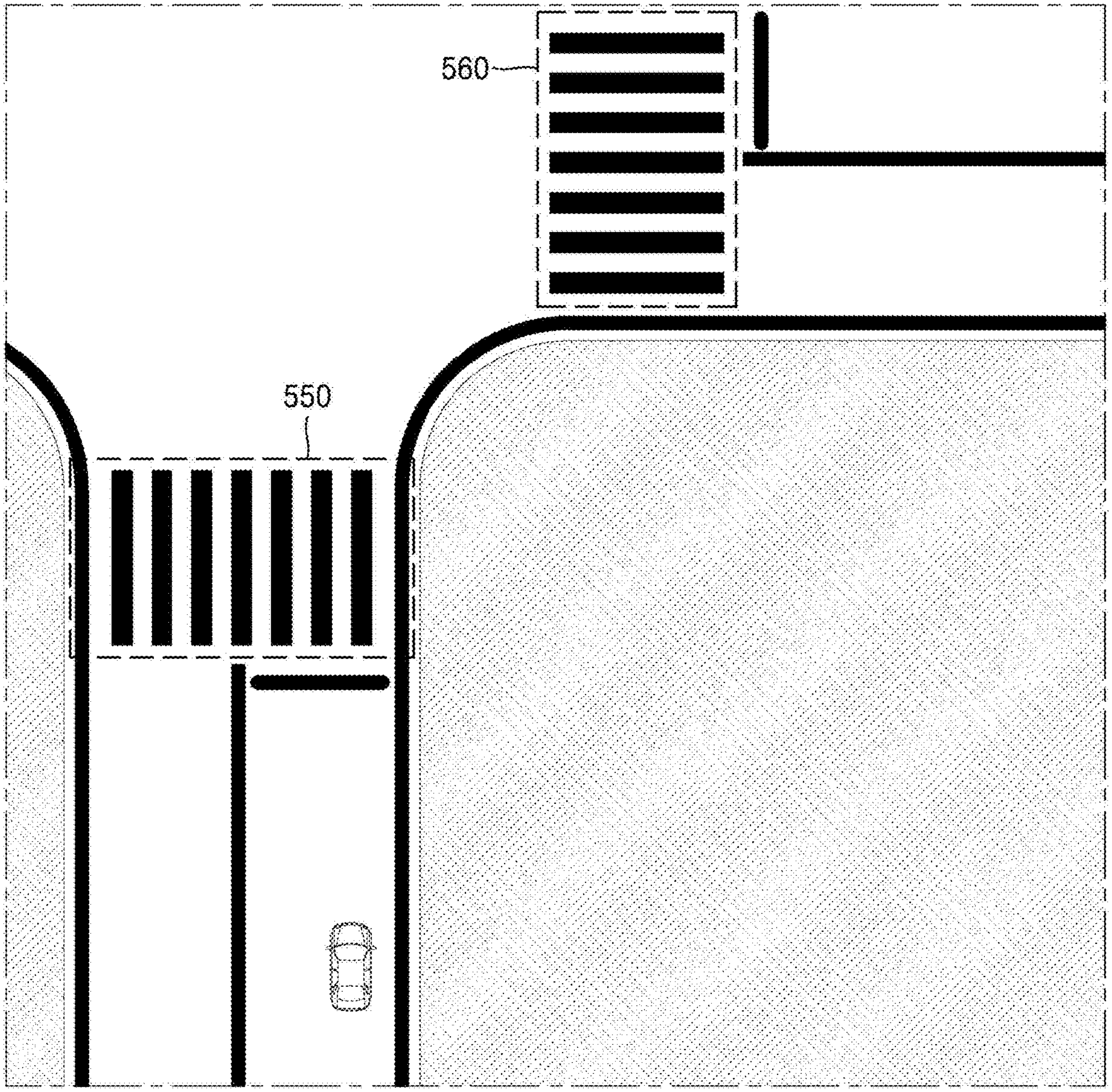

FIG. 5D schematically illustrates a crossroad including an entry crosswalk and an exit crosswalk.

Referring to FIG. 5D, a vehicle travels on a road along a right-turning path, and the right-turning path includes two crosswalks, and thus, the vehicle passes through an entry crosswalk 550 and an exit crosswalk 560 after some time.

In an embodiment, as described above, when determining that the vehicle may not pass through the entry crosswalk

550, an autonomous driving apparatus may generate a first virtual stop line corresponding to the entry crosswalk 550.

It may be easily understood by those skilled in the art that, in relation to the process of generating the virtual stop line, the embodiments described above may be applied to the process of generating the first virtual stop line. For example, the autonomous driving apparatus may detect that a stop line is marked before a point at which the vehicle enters the entry crosswalk 550, and may generate the first virtual stop line to be the same as the marked stop line.

Figure 5E:
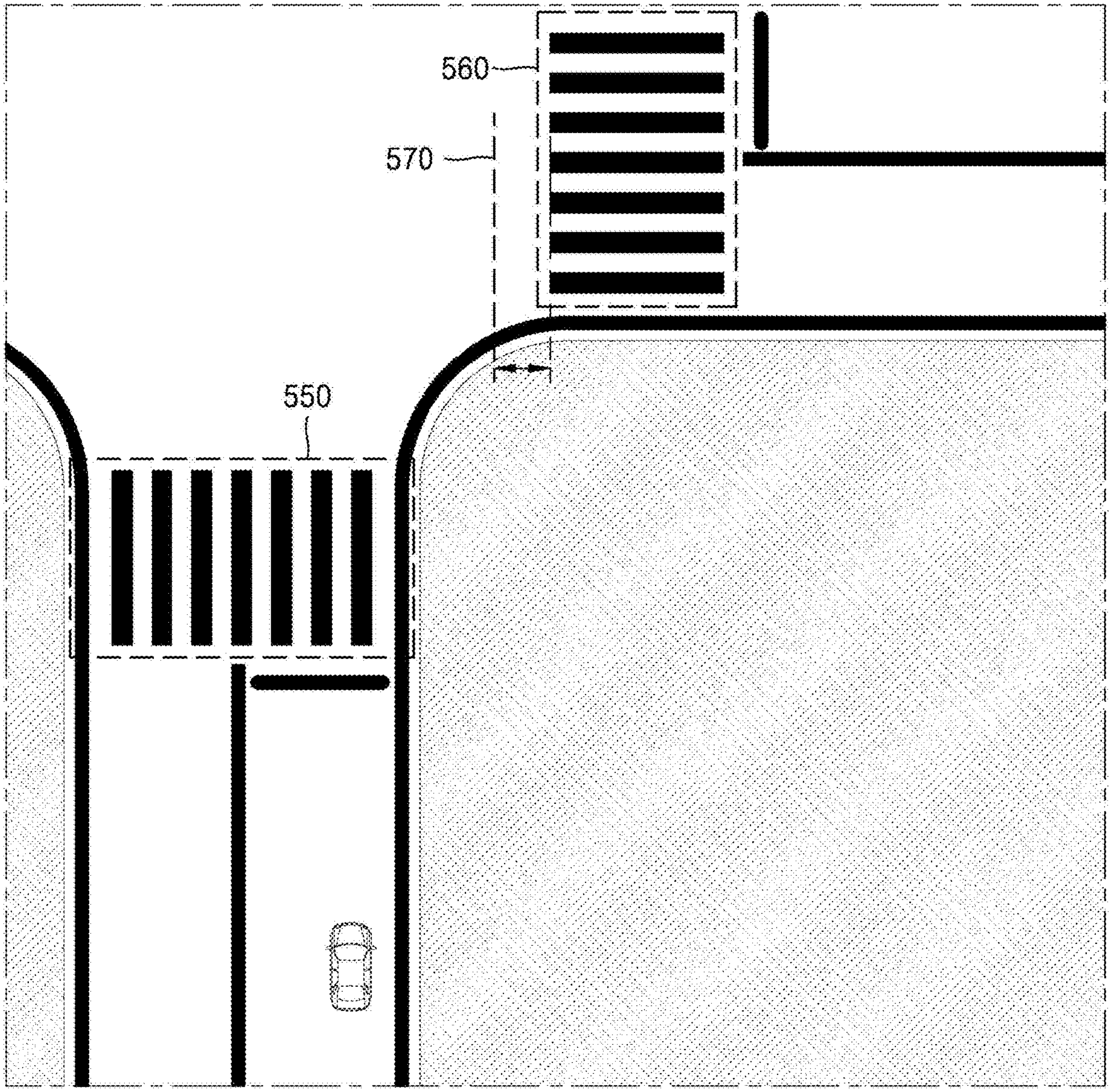

FIG. 5E schematically illustrates a second virtual stop line generated for an exit crosswalk, according to an embodiment.

Referring to FIG. 5E, an autonomous driving apparatus may determine that a vehicle may pass through an entry crosswalk 550 but may not pass through an exit crosswalk 560, and may generate a second virtual stop line 570 corresponding to the exit crosswalk 560.

As illustrated in FIG. 5E, in general, a stop line associated with the exit crosswalk 560 is not marked on a path through which the vehicle travels. Therefore, the second virtual stop line 570 corresponding to the exit crosswalk 560 may be generated independently of whether or not the stop line is marked.

In an embodiment, the autonomous driving apparatus may generate a second virtual stop line parallel to an exit crosswalk by separating the second virtual stop line from the exit crosswalk by a certain distance.

As illustrated in FIG. 5E, the autonomous driving apparatus may generate the second virtual stop line 570 parallel to the exit crosswalk 560 by separating the second virtual stop line 570 from the exit crosswalk 560 by a certain distance.

In an embodiment, the certain distance may be any appropriate value, such as 0.3 m, 0.5 m, 0.7 m, 1 m, 2 m or 5 m. In an embodiment, the certain distance may be calculated differently according to a shape, structure, or size of a road.

In the disclosure, the autonomous driving apparatus may control the vehicle to stop without crossing a virtual stop line.

In an embodiment, the autonomous driving apparatus may control the vehicle to stop at a location ahead of the virtual stop line by a certain distance to enhance safety in preparation for errors in calculation or driving control. For example, the certain distance may be 0.3 m, 0.5 m, or 1 m.

In an embodiment, the autonomous driving apparatus may control the vehicle not to cross a first virtual stop line or a second virtual stop line.

In an embodiment, the autonomous driving apparatus may control, on the basis of dimensional information of the vehicle, the vehicle so that any portion of the vehicle does not cross a virtual stop line.

In an embodiment, the autonomous driving apparatus may calculate a target acceleration of the vehicle on the basis of a current velocity of the vehicle and a distance from a current location of the vehicle to a virtual stop line, and control the vehicle accordingly.

In an embodiment, a series of operations for controlling a vehicle by an autonomous driving apparatus, as described above, may be triggered when a distance from a current location of a vehicle to a point at which a crosswalk starts becomes a threshold value. For example, the threshold value may be 20 m, 30 m, or 50 m. In an embodiment, the threshold value may be changed according to regulations of a road on which the vehicle travels.

In an embodiment, the series of operations for controlling the vehicle by the autonomous driving apparatus, as described above, may be triggered when a remaining time of a signal becomes a threshold value. Here, the signal may include a red light for a pedestrian, a straight ahead signal for a vehicle, and the like. For example, the threshold value may be 5 seconds, 7 seconds, 10 seconds, 15 seconds, or 20 seconds. The threshold value may be changed according to a congestion situation of a road on which the vehicle travels or a current velocity of the vehicle.

Figure 6:
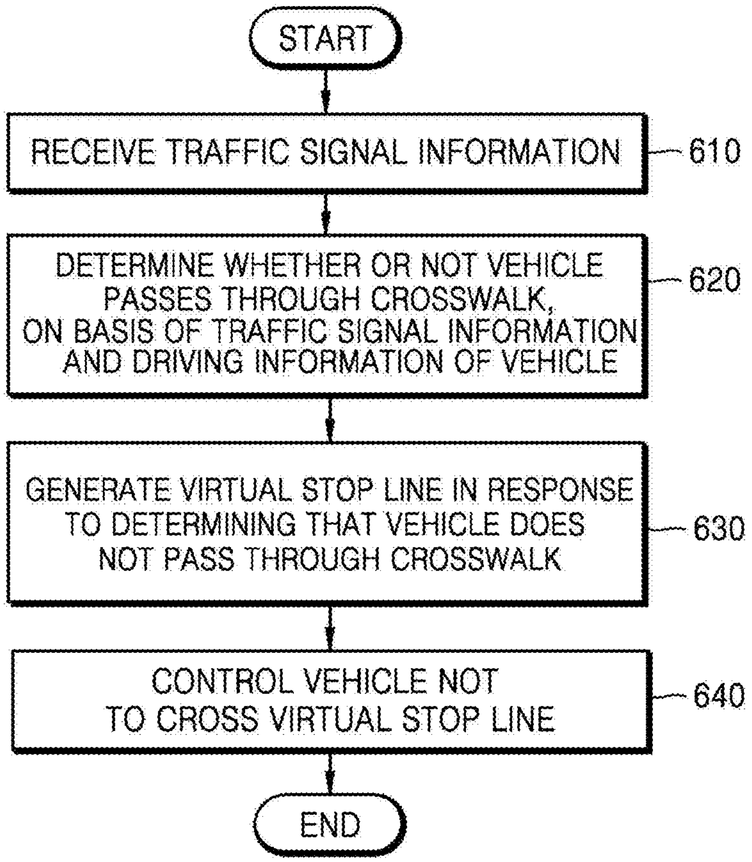
FIG. 6 is a flowchart of a method of controlling a vehicle, according to an embodiment.

FIG. 6 is a flowchart of a method of controlling a vehicle, according to an embodiment.

The method of controlling a vehicle, illustrated in FIG. 6, is related to the embodiments described above, and thus, even when omitted below, the above descriptions may be applied to the method of FIG. 6.

Operations illustrated in FIG. 6 may be executed by the autonomous driving apparatus described above. In detail, the operations illustrated in FIG. 6 may be executed by a processor included in the autonomous driving apparatus described above.

In operation 610, the processor may receive traffic signal information.

In an embodiment, the traffic signal information may be transmitted from at least one of another vehicle, an infrastructure, or a pedestrian by using a V2X technology.

In an embodiment, the traffic signal information may include a remaining time of a red light for a pedestrian.

In operation 620, the processor may determine whether or a vehicle passes through a crosswalk, on the basis of the traffic signal information and driving information of a vehicle.

In an embodiment, the processor may determine whether or not the vehicle may pass through the crosswalk by predicting a future location of the vehicle when the remaining time of the red light for the pedestrian elapses, determining that the vehicle may pass through the crosswalk when the future location of the vehicle is a point after passing through the crosswalk according to the result of the prediction, and determining that the vehicle may not pass through the crosswalk when the future location of the vehicle is not the point after passing through the crosswalk.

In an embodiment, the processor may predict the future location of the vehicle on the basis of a current velocity of the vehicle, a target velocity of the vehicle, a target acceleration of the vehicle, and the remaining time of the red signal for the pedestrian.

In an embodiment, in response to the current velocity of the vehicle being less than the target velocity, the processor may predict the future location of the vehicle by assuming that the vehicle travels while maintaining the target velocity to a point in time when the remaining time elapses when the current velocity increases according to the target acceleration and reaches the target velocity.

In an embodiment, in response to the current velocity of the vehicle being greater than the target velocity, the processor may predict the future location of the vehicle by assuming that the vehicle travels while maintaining the target velocity from a current point in time to the point in time when the remaining time elapses.

In an embodiment, when another vehicle is present between the vehicle and the crosswalk, the target velocity of the vehicle may be the same as a velocity of the other vehicle.

In an embodiment, when the vehicle travels along a right-turning path including two crosswalks at an intersection, the crosswalk may include a first crosswalk through which the vehicle passes before turning right and a second crosswalk through which the vehicle passes after turning right, and the processor may determine whether or not the vehicle passes through the crosswalk by determining whether or not the vehicle passes through the first crosswalk and determining whether or not the vehicle passes through the second crosswalk.

In operation 630, the processor may generate a virtual stop line in response to determining that the vehicle may not pass through the crosswalk.

In an embodiment, when a stop line is marked between the crosswalk and the vehicle, the processor may generate the virtual stop line to be the same as the marked stop line.

In an embodiment, when the stop line is not marked between the crosswalk and the vehicle, the processor may generate the virtual stop line parallel to the crosswalk by separating the virtual stop line from the crosswalk by a certain distance.

In an embodiment, in response to determining that the vehicle may not pass through the first crosswalk, the processor may generate the virtual stop line by generating a first virtual stop line corresponding to the first crosswalk.

In an embodiment, the processor may generate the first virtual stop line by generating the first virtual stop line to be the same as the stop line marked between the first crosswalk and the vehicle.

In an embodiment, in response to determining that the vehicle pass through the first crosswalk but may not pass through the second crosswalk, the processor may generate the virtual stop line by generating a second virtual stop line corresponding to the second crosswalk.

In an embodiment, the processor may generate the second virtual stop line by generating the second virtual stop line parallel to the second crosswalk by separating the second virtual stop line from the second crosswalk by a certain distance.

In operation 640, the processor may control the vehicle not to cross the virtual stop line.

Figure 7:
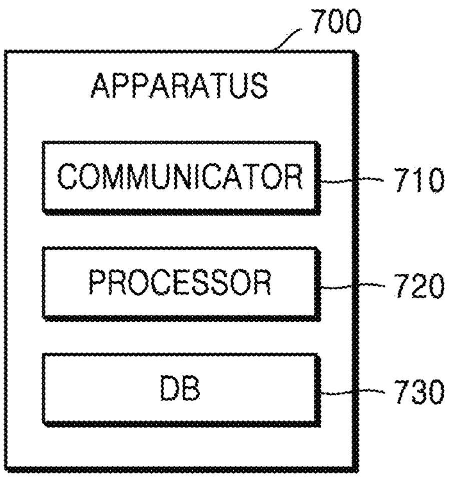
FIG. 7 is a block diagram of an apparatus for controlling a vehicle, according to an embodiment.

FIG. 7 is a block diagram of an apparatus for controlling a vehicle, according to an embodiment.

Referring to FIG. 7, an apparatus 700 for controlling a vehicle may include a communicator 710, a processor 720, and a database (DB) 730. FIG. 7 illustrates that the apparatus 700 for controlling a vehicle includes only components related to the embodiment. Accordingly, those skilled in the art may understand that other general-purpose components may be further included, in addition to the components illustrated in FIG. 7.

The communicator 710 may include one or more components that enable wired/wireless communication with an external server or an external apparatus. For example, the communicator 710 may include at least one of a short-range communicator (not shown), a mobile communicator (not shown), and a broadcast receiver (not shown).

The DB 730 may be hardware for storing various types of data processed within the apparatus 700 for controlling a vehicle, and may store programs for processing and controlling by the processor 720. The DB 730 may store payment information, user information, and the like.

The DB 730 includes random access memory (RAM), such as dynamic random access memory (DRAM) and static random access memory (SRAM), read-only memory (ROM), electrically erasable programmable read-only memory (EEPROM), and CD-ROM, Blu-ray or other optical disk storages, a hard disk drive (HDD), a solid state drive (SSD), or flash memory.

The processor 720 controls overall operations of the apparatus 700 for controlling a vehicle. For example, the processor 720 may generally control an input unit (not shown), a display (not shown), the communicator 710, the DB 730, and the like by executing the programs stored in the DB 730. The processor 720 may control an operation of the apparatus 700 for controlling a vehicle by executing the programs stored in the DB 730.

The processor 720 may control at least some of operations of an autonomous driving apparatus described above with reference to FIGS. 1 to 6.

The processor 720 may be implemented by using at least one of application specific integrated circuits (ASICs), digital signal processors (DSPs), digital signal processing devices (DSPDs), programmable logic devices (PLDs), field. programmable gate arrays (FPGAs), controllers, micro-controllers, microprocessors, and electrical units for performing other functions.

In an embodiment, the apparatus 700 for controlling a vehicle may be an electronic apparatus having mobility. For example, the apparatus 700 for controlling a vehicle may be implemented as a smartphone, a tablet personal computer (PC), a PC, a smart TV, a personal digital assistant (PDA), a laptop computer, a media player, a navigation system, a device having a camera mounted thereon, and other mobile electronic devices. In addition, the apparatus 700 for controlling a vehicle may be implemented as a wearable device, such as a watch, glasses, a hair band, and a ring having a communication function and a data processing function.

In an embodiment, the apparatus 700 for controlling a vehicle may be an electronic apparatus embedded in a vehicle. For example, the apparatus 700 for controlling a vehicle may be an electronic apparatus inserted into a vehicle via tuning after a production process thereof.

In an embodiment, the apparatus 700 for controlling a vehicle may be a server located outside a vehicle. The server may be implemented as a computer apparatus or a plurality of computer apparatuses that perform communication over a network to provide commands, codes, files, content, services, and the like.

The server may receive data needed for determining a movement path of the vehicle from apparatuses mounted on the vehicle, and may determine the movement path of the vehicle on the basis of the received data.

In an embodiment, a process performed by the apparatus 700 for controlling a vehicle may be performed by at least some of an electronic apparatus having mobility, an electronic apparatus embedded in a vehicle, and a server located outside the vehicle.

According to the problem solving means of the disclosure described above, an autonomous vehicle may be effectively controlled by receiving driving environment information, in particular, information regarding a traffic signal, rather than relying only on cameras and sensors mounted on the autonomous vehicle.

Also, the safety of a passenger as well as the safety of a pedestrian may be ensured and traffic order may be observed by controlling the autonomous vehicle by considering a change in the traffic signal rather than relying only on a current state of the traffic signal, and thus, a pleasant and safe driving experience may be provided.

In addition, even when a stop line corresponding to a crosswalk is not marked on a road, safety may be promoted by generating a virtual stop line.

Embodiments according to the disclosure may be implemented in the form of a computer program that may be executed on a computer via various types of components, and the computer program may be recorded on a computer-readable medium. Here, the medium may include magnetic media, such as a hard disk, a floppy disk, and a magnetic tape, optical recording media, such as CD-ROM and DVD, magneto-optical media, such as a floptical disk, and hardware devices, such as ROM, RAM, and flash memory devices specially configured to store and execute program instructions.

Meanwhile, the computer program may be specially designed and configured for the disclosure, or may be known to and used by those skilled in the art of the computer software field. Examples of the computer program may include not only machine language code generated by a compiler but also high-level language code that may be executed by a computer by using an interpreter or the like.

According to one embodiment, the method according to various embodiments may be included and provided in computer program products. The computer program products may be traded between sellers and buyers as commodities. The computer program products may be distributed in the form of device-readable storage media (e.g., compact disc read only memory (CD-ROM)), or may be distributed (e.g., downloaded or uploaded) online via an application store (e.g., Play Store™) or between two user devices. When distributed online, at least a portion of a computer program product may be temporarily stored or temporarily generated in a device-readable storage medium such as a server of a manufacturer, a server of an application store, or a memory of a relay server.

The operations constituting the method according to the disclosure may be performed in any appropriate order unless an order of the operations is explicitly stated or stated to the contrary. The disclosure is not necessarily limited according to the order of description of the operations. The use of all examples or example terms (e.g., and the like) in the disclosure is simply to describe the disclosure in detail, and the scope of the disclosure is limited due to the examples or example terms unless limited by claims. In addition, those skilled in the art may appreciate that various modifications, combinations and changes may be made according to design conditions and factors within the scope of the appended claims or equivalents thereof.

Therefore, the spirit of the disclosure should not be determined while limited to the embodiments described above, and all scopes equivalent to or equivalently changed from the claims as well as the claims described below should fall within the scope of the spirit of the disclosure.

What is claimed is:

1. A method of controlling a vehicle, the method comprising:

by controlling communicator, requesting transmission of traffic signal information and receiving the traffic signal information at every certain periods;

determining whether or not a vehicle passes through a crosswalk, on the basis of the traffic signal information and driving information of the vehicle;

in response to determining that the vehicle does not pass through the crosswalk, generating a virtual stop line which is a reference line for controlling the vehicle to reduce speed and stop without crossing; and by controlling body control module, controlling the vehicle not to cross the virtual stop line, and wherein the traffic signal information includes a remaining time of a red light for a pedestrian, and the determining whether or not the vehicle passes through the crosswalk includes:

predicting a future location of the vehicle when the remaining time elapses; determining that the vehicle passes through the crosswalk when the future location of the vehicle is a point after passing through the crosswalk according to a result of the prediction; and determining that the vehicle does not pass through the crosswalk when the future location of the vehicle is not the point after passing through the crosswalk, and wherein the predicting the future location of the vehicle includes:

in response to a current velocity of the vehicle being less than a target velocity, predicting the future location of the vehicle by assuming that the vehicle travels while maintaining the target velocity to a point in time when the remaining time elapses when the current velocity increases according to a target acceleration and reaches the target velocity; and in response to the current velocity of the vehicle being greater than the target velocity, predicting the future location of the vehicle by assuming that the vehicle travels while maintaining the target velocity from a current point in time to the point in time when the remaining time elapses.

2. The method of claim 1, wherein the traffic signal information is transmitted from at least one of another vehicle, an infrastructure, and a pedestrian by using a vehicle-to-everything (V2X) technology.

3. The method of claim 1, wherein, when another vehicle travels at a lower velocity than the current velocity of the vehicle between the vehicle and the crosswalk, the target velocity of the vehicle is the same as the velocity of the other vehicle.

4. The method of claim 1, wherein the generating the virtual stop line includes, when a stop line is marked between the crosswalk and the vehicle, generating the virtual stop line to be the same as the marked stop line.

5. The method of claim 4, wherein the generating the virtual stop line includes, when the stop line is not marked between the crosswalk and the vehicle, generating the virtual stop line parallel to the crosswalk by separating the virtual stop line from the crosswalk by a certain distance.

6. The method of claim 1, wherein, when the vehicle travels along a right-turning path including two crosswalks at an intersection, the crosswalk includes a first crosswalk through which the vehicle passes before turning right and a second crosswalk through which the vehicle passes after turning right, and the determining whether or not the vehicle passes the crosswalk includes: determining whether or not the vehicle passes through the first crosswalk; and determining whether or not the vehicle passes through the second crosswalk.

7. The method of claim 6, wherein the generating the virtual stop line includes:

in response to determining that the vehicle does not pass through the first crosswalk, generating a first virtual stop line corresponding to the first crosswalk; and in response to determining that the vehicle passes through the first crosswalk but does not pass through the second crosswalk, generating a second virtual stop line corresponding to the second crosswalk.

8. The method of claim 7, wherein the generating the first virtual stop line includes generating the first virtual stop line to be the same as the stop line marked between the first crosswalk and the vehicle.

9. The method of claim 7, wherein the generating the second virtual stop line includes generating the second virtual stop line parallel to the second crosswalk by separating the second virtual stop line from the second crosswalk by a certain distance.

10. An apparatus for controlling a vehicle, the apparatus comprising:

a memory configured to store at least one program; and a processor configured to operate by executing the at least one program, wherein the processor is configured to:

by controlling communicator, request transmission of traffic signal information and receive the traffic signal information at every certain periods;

determine whether or not a vehicle passes through a crosswalk, on the basis of the traffic signal information and driving information of the vehicle;

in response to determining that the vehicle does not pass through the crosswalk, generate a virtual stop line which is a reference line for controlling the vehicle to reduce speed and stop without crossing; and by controlling body control module, control the vehicle not to cross the virtual stop line, and wherein the traffic signal information includes a remaining time of a red light for a pedestrian, and the determining whether or not the vehicle passes through the crosswalk includes:

predicting a future location of the vehicle when the remaining time elapses; determining that the vehicle passes through the crosswalk when the future location of the vehicle is a point after passing through the crosswalk according to a result of the prediction; and determining that the vehicle does not pass through the crosswalk when the future location of the vehicle is not the point after passing through the crosswalk wherein the predicting the future location of the vehicle includes:

in response to a current velocity of the vehicle being less than a target velocity, predicting the future location of the vehicle by assuming that the vehicle travels while maintaining the target velocity to a point in time when the remaining time elapses when the current velocity increases according to a target acceleration and reaches the target velocity; and in response to the current velocity of the vehicle being greater than the target velocity, predicting the future location of the vehicle by assuming that the vehicle travels while maintaining the target velocity from a current point in time to the point in time when the remaining time elapses.

11. A non-transitory computer-readable recording medium recording thereon a program for executing the method of claim 1 on a computer.

* * * * *